(12) United States Patent
Brusselle et al.

(10) Patent No.: US 9,512,245 B2
(45) Date of Patent: Dec. 6, 2016

(54) CATALYST SLURRY PREPARATION SYSTEM AND USE THEREOF

(71) Applicant: Total Research & Technology Feluy, Seneffe (Feluy) (BE)

(72) Inventors: Alain Brusselle, Wilrijk (BE); Louis Fouarge, Dilbeek (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

(21) Appl. No.: 14/994,812

(22) Filed: Jan. 13, 2016

(65) Prior Publication Data

US 2016/0152741 A1    Jun. 2, 2016

Related U.S. Application Data (63) Continuation of application No. 13/812,702, filed as application No. PCT/EP2011/063136 on Jul. 29, 2011, now Pat. No. 9,273,157.

(30) Foreign Application Priority Data

Jul. 30, 2010 (EP) .................... 10171370

(51) Int. Cl.
| | |
|---|---|
| *C08F 10/02* | (2006.01) |
| *B01F 7/00* | (2006.01) |
| *B01F 7/16* | (2006.01) |
| *B01F 7/22* | (2006.01) |
| *B01J 8/00* | (2006.01) |
| *C08F 10/00* | (2006.01) |

(Continued)

(52) U.S. Cl.
CPC ........... *C08F 10/02* (2013.01); *B01F 7/00633* (2013.01); *B01F 7/1675* (2013.01); *B01F 7/22* (2013.01); *B01F 13/0827* (2013.01); *B01F 13/0845* (2013.01); *B01J 8/002* (2013.01); *B01J 8/0035* (2013.01); *C08F 4/00* (2013.01); *C08F 10/00* (2013.01); *B01F 13/0836* (2013.01); *C08F 4/65912* (2013.01); *C08F 4/65927* (2013.01)

(58) Field of Classification Search
CPC ....... C08F 10/00; C08F 4/65916; C08F 10/02; C08F 4/00; C08F 4/65912; C08F 4/65927; B01F 13/0827; B01F 13/0836; B01F 13/0845; B01F 7/00633; B01F 7/1675; B01F 7/22; B01J 8/002; B01J 8/0035

See application file for complete search history.

(56) References Cited

U.S. PATENT DOCUMENTS

| | | | | | |
|---|---|---|---|---|---|
| 2,008,684 | A | * | 7/1935 | Craddock | ............... B01F 7/169 366/249 |
| 2,668,694 | A | * | 2/1954 | Monick | ............... B01F 7/00641 366/294 |

(Continued)

*Primary Examiner* — Tony G Soohoo
(74) *Attorney, Agent, or Firm* — Albert Shung (57) ABSTRACT

A process includes preparing a diluted catalyst slurry in a catalyst slurry preparation system. The diluted catalyst slurry contains solid particulate catalyst and liquid hydrocarbon diluent. The catalyst slurry preparation system includes a mixing vessel with a top part, a bottom part and a rotatable impeller system which is actuated by a motor. The rotatable impeller system has a magnetic actuated agitator shaft which is positioned along a longitudinal axis of the mixing vessel and extends through the top part of the mixing vessel. At least two double-bladed hubs are fixed to the magnetic actuated agitator shaft.

17 Claims, 5 Drawing Sheets

(51) Int. Cl.
*C08F 4/00* (2006.01)
*B01F 13/08* (2006.01)
*C08F 4/659* (2006.01)
*C08F 4/6592* (2006.01)

(56) References Cited

U.S. PATENT DOCUMENTS

| | | | | |
|---|---|---|---|---|
| 3,980,628 A * | 9/1976 | Sorenson | ............ | B01J 19/0013 422/135 |
| 4,243,636 A * | 1/1981 | Shiraki | ............... | B01F 3/04531 366/101 |
| 4,438,074 A * | 3/1984 | Wilt | ......................... | B01J 19/18 366/171.1 |
| 4,563,665 A * | 1/1986 | Rohlfing | ............... | B01F 3/1221 366/184 |
| 4,587,314 A * | 5/1986 | Wilt | ..................... | B01J 19/0066 526/335 |
| 4,690,804 A * | 9/1987 | Rohlfing | ............... | B01F 3/1221 222/241 |
| 4,799,862 A * | 1/1989 | Davidson | ............ | B01F 3/04531 366/307 |
| 5,078,505 A * | 1/1992 | Nyman | ................. | B01F 7/1675 366/262 |
| 5,098,667 A * | 3/1992 | Young | ...................... | B01J 8/001 137/4 |
| 5,102,630 A * | 4/1992 | Lee | .......................... | B01J 8/222 261/93 |
| 5,368,390 A * | 11/1994 | Gambrill | ................... | B01F 7/06 366/273 |
| 5,399,014 A * | 3/1995 | Takata | ................ | B01F 7/00291 366/262 |
| 6,024,481 A * | 2/2000 | Hillstrom | .............. | B01F 3/0853 366/155.1 |
| 6,082,890 A * | 7/2000 | Heinzmann | ......... | B01F 7/00341 366/330.3 |
| 6,109,449 A * | 8/2000 | Howk | ................. | B01F 3/04539 209/169 |
| 8,328,412 B2 * | 12/2012 | Higbee | ............... | B01F 7/00341 366/270 |
| 2002/0145940 A1 * | 10/2002 | Terentiev | ............ | B01F 13/0818 366/273 |
| 2003/0227817 A1 * | 12/2003 | Martel | ............... | B01D 19/0063 366/142 |
| 2004/0122188 A1 * | 6/2004 | Burns | ...................... | B01J 8/003 526/90 |
| 2004/0145966 A1 * | 7/2004 | Kar | ....................... | B01F 3/1221 366/329.1 |
| 2005/0007874 A1 * | 1/2005 | Roszczenko | ........ | B01F 3/04248 366/270 |
| 2005/0272891 A1 * | 12/2005 | Fouarge | ................. | B01J 8/0035 526/64 |
| 2007/0053238 A1 * | 3/2007 | Kocienski | ............... | B01F 7/186 366/273 |
| 2007/0078238 A1 * | 4/2007 | Burns | .................... | B01J 8/0015 526/65 |
| 2008/0039596 A1 * | 2/2008 | Fouarge | .................. | B01J 8/003 526/64 |
| 2009/0318637 A1 * | 12/2009 | Siraux | .................... | B01J 8/0015 526/64 |
| 2010/0264014 A1 * | 10/2010 | Mignon | ................. | B01D 3/425 203/82 |
| 2010/0301042 A1 * | 12/2010 | Kahlert | ..................... | B01F 7/18 220/23.86 |
| 2012/0003733 A1 * | 1/2012 | Gueneron | ............... | C12M 23/26 435/289.1 |
| 2012/0252989 A1 * | 10/2012 | Dewachter | ............. | C08F 10/02 526/64 |
| 2012/0271012 A1 * | 10/2012 | Dewachter | ............. | B01J 8/003 526/64 |
| 2013/0130891 A1 * | 5/2013 | Brusselle | ............... | B01J 8/0035 502/152 |

* cited by examiner

CATALYST SLURRY PREPARATION SYSTEM AND USE THEREOF

CROSS-REFERENCE TO RELATED APPLICATIONS

This application is a Continuation of U.S. patent application Ser. No. 13/812,702, filed on Jan. 28, 2013; which is a National Stage Entry of PCT/EP2011/063136, filed on Jul. 29, 2011; which claims priority to EP 10171370.9, filed on Jul. 30, 2010; the entireties of which are incorporated herein by reference.

TECHNICAL FIELD OF THE INVENTION

The present invention relates to the use of a catalyst preparation system for preparing a diluted catalyst slurry which is to be used for producing a particulate polyethylene product in a loop reactor. In particular, the invention relates to such use, wherein the system comprising a mixing vessel for mixing a particulate catalyst and a liquid hydrocarbon diluent. According to the invention, diluted catalyst slurry is prepared in a mixing vessel comprising a rotatable impeller system comprising double-bladed hubs.

BACKGROUND OF THE INVENTION

Polyethylene (PE) is synthesized by polymerizing ethylene ($CH_2=CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Ethylene polymerizations are frequently carried out in a loop reactor using ethylene monomer, liquid diluent and catalyst, optionally one or more co-monomers, and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed therefrom, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Polymerization of ethylene involves the polymerization of ethylene monomer in the reactor in the presence of a polymerization catalyst and optionally, if required depending on the used catalyst, an activating agent. Suitable catalysts for the preparation of polyethylene comprise chromium catalysts, Ziegler-Natta catalysts and metallocene catalysts. Typically, the catalyst is used in particulate form. The polyethylene is produced as a resin/powder with a hard catalyst particle at the core of each grain of the powder.

Several systems have been disclosed which involve the preparation and the supply of catalyst slurry to a polymerization reaction. In general, for preparing catalyst slurry, a mixture of dry solid particulate catalyst and diluent are apportioned in a catalyst mixing vessel and thoroughly mixed. Then such catalyst slurry is typically transferred to a polymerization reactor for contact with the monomer reactants.

It is known in the art that for the production of ethylene polymers having suitable properties it is important during polymerization to control reaction conditions, including reaction temperatures, reactant concentration, etc. Polymerization reactions are also sensitive to the quantity, quality and the type of catalyst utilized. Sub-optimal conditions at the start of or during the polymerization reaction may lead to a sub-optimal polymerization conditions resulting for instance in low production yields and/or the production of polymers having undesired properties and/or falling off specifications. In view thereof, ethylene polymerization reactions require accurate and adaptive monitoring and control of the reaction conditions.

In particular, the concentration of a particulate catalyst in a diluent has a direct and immediate effect on polymer characteristics such as polymerization product granulometry and polymerization product particle density, as well as on polymerization characteristics such as polymerization processivity. Therefore, a change in catalyst concentration has a profound effect on various polymerization parameters and hence the final polymer product. Indeed, (local) catalyst concentration differences in a polymerization reaction result in unwarranted polymer heterogeneity in respect of for instance product density, granulometry and molecular weight (distribution).

As catalyst slurries comprise a solid particulate catalyst suspended in a liquid diluent, such slurries are prone to sedimentation. Adequate mixing of the catalyst slurry is needed to assure a homogeneous distribution of the solid catalyst particles in the diluent before the catalyst slurry is fed to the polymerization reactor.

Moreover, the physicochemical characteristics of the catalyst well as of the diluent, including for instance the type of catalyst and diluent, the specific gravity of the catalyst, catalyst granulometry, catalyst settling velocity, catalyst concentration, the viscosity of the diluent and the catalyst slurry as well as the desired properties of the polymerization product require a highly flexible and adaptable catalyst slurry preparation and mixing system for adequately preparing a diluted catalyst slurry.

In view of the above, there remains a need in the art to provide an improved catalyst preparation system for preparing a diluted catalyst slurry with suitable properties for use in a polymerization process for making polyolefin resin, and in particular polyethylene.

SUMMARY OF THE INVENTION

The present invention relates to the use of a catalyst slurry preparation system for the preparation of a diluted catalyst slurry comprising a solid particulate catalyst and a liquid hydrocarbon diluent, wherein said catalyst slurry preparation system comprises a cylindrical mixing vessel wherein said mixing vessel comprises a top part, a bottom part and a rotatable impeller system which is actuated by a motor, said impeller system comprising a magnetic actuated agitator shaft which is positioned along a longitudinal axis of said mixing vessel and extends through said top part of said mixing vessel and comprises at least two double-bladed hubs, which are fixed to said agitator shaft.

The present invention also relates to the use of the catalyst slurry preparation system as described above for the preparation of a diluted catalyst slurry starting from settled catalyst. In particular, the present invention also relates to the use of the catalyst slurry preparation system as described above for suspending or resuspending settled catalyst in the mixing vessel. As used herein, "settled catalyst" is meant catalyst or catalyst particles, e.g. catalyst which is provided onto a carrier, which has precipitated or undergone sedimentation and settled at the bottom of the mixing vessel, e.g. under the influence of gravity, and which is thus not distributed homogeneously anymore in the diluent.

The present invention further relates to a catalyst slurry preparation system as described above for the production of a catalyst slurry, in particular a diluted catalyst slurry, to be used in an ethylene polymerization process.

The present invention further relates to a method for preparing a catalyst slurry, in particular a diluted catalyst slurry, with the catalyst slurry preparation system as described above.

The inventors have surprisingly found that in the context of catalyst slurry preparation an impeller system comprising two or more double-bladed impellers mounted on a central axis provides for efficient homogenization of the catalyst in the diluent. In this way, catalyst slurry of controlled properties, in particular a controlled catalyst concentration can be fed to a polymerization reactor, resulting in a polymerization reaction, in particular ethylene polymerization, for the production of a polymer with uniform and homogeneous physicochemical characteristics.

In an embodiment, the input of concentrated catalyst is performed using a metering device and the diluent is fed by pressure regulated device. The output of diluted catalyst slurry from the mixing vessel to the polymerization loop reactor typically is performed with a pump under high pressure. The catalyst slurry preparation system according to the invention assures adequate mixing and homogenization of the catalyst slurry under these conditions. In particular, slurry comprising different types of particulate catalysts, combinations of catalyst slurries or catalysts with a varying particle size or a broad distribution of particle size can be efficiently mixed in the catalyst slurry preparation system according to the invention.

As used herein, "adequate mixing" comprises homogenization, or the creation of a homogeneous suspension with a substantially consistent concentration over time. Adequate mixing further means that no relevant sedimentation of the catalyst or catalyst provided onto a carrier takes place during operation, i.e. the catalyst or catalyst provided onto a carrier remains in suspension during operation. Adequate mixing further comprises the resuspension of settled or precipitated catalyst or catalyst provided onto a carrier.

The at least two impellers are fixed, preferably slidably fixed, on an agitation shaft, which is positioned along a central axis of the mixing vessel. Therefore, the position of the impellers, i.e. the double-bladed hubs, along the agitator shaft advantageously can be individually adjusted, depending on the physicochemical characteristics of the catalyst and diluent to ensure optimal mixing and homogenization of the catalyst slurry.

In an embodiment, the invention relates to the use as indicated above, wherein the mixing vessel of catalyst slurry preparation system according to the invention further comprises one or more baffle(s), wherein said one or more baffles are fixed longitudinally along the inner wall of the mixing vessel, whereby said one or more baffles extend radially inward. The use of baffles prevents the movement of the fluid inside the mixing vessel as a whole (i.e. as one body) and thus prevents vortex movement. In contrast to vortex movement, the baffles assure turbulent movement, thereby helping in thorough mixing and homogenization.

In an embodiment, the invention relates to the use as indicated above, wherein said one or more baffles extend radially inward over a distance between 10% and 20% of the diameter of the mixing vessel.

In an embodiment, the invention relates to the use as indicated above, wherein the blades of each double-bladed hub are symmetrically positioned about the hub and have a pitch angle ($\alpha$) comprised between 65° and 75°. The pitch angle of the blades of the impellers according to the invention assures the creation of an axial flow of the catalyst slurry as well as a radial flow of the catalyst slurry. Whereas a predominant axial flow or radial flow would direct the catalyst slurry respectively predominantly downwards or sidewards, a combined axial and radial flow effectively combines flow directions, likewise aiding in thorough mixing and homogenization.

In another embodiment, the invention relates to the use as indicated above, wherein each blade of said double-bladed hub is an airfoil comprising a root portion attached to the hub and a radially outwardly disposed tip portion with therebetween an upper side edge facing the top part of said mixing vessel and a lower side edge facing said bottom part of said mixing vessel. It has been found that specifically double-bladed impellers are most useful in preparing homogeneous catalyst slurries according to the invention.

In an embodiment, the invention relates to the use as indicated above, wherein the tip portion of the blades according to the invention inclines convexly toward the top part of the mixing vessel beyond the upper side edge and extends more proximal to the top part of the mixing vessel than the root portion, wherein the upper side edge extends laterally from the root portion to the tip portion and inclines convexly toward the tip portion, wherein the lower side edge is concave. This specific shape of the blades of the impeller according to the invention has been found to accord perfectly with the desired level of mixing and homogenization of the catalyst slurry.

In another embodiment, the invention relates to the use as indicated above, wherein a first double-bladed hub is fixed to the agitator shaft in the lower half of the mixing vessel.

In yet another embodiment, the invention relates to the use as indicated above, wherein a second double-bladed hub is fixed to the agitator shaft in the lower quarter of the mixing vessel.

In yet another embodiment, the invention relates to the use as indicated above, wherein the distance between the first and second double-bladed hub is between one half to one third of the length of the agitator shaft.

Depending on the specific application, the position of the at least two impellers can be varied with respect to the dimensions of the mixing vessel and with respect to each other as well as in view of the filling level of the mixing vessel. The versatility of arrangement of the impellers in the mixing vessel allows for a swift, and hence economical, adjustment of the catalyst slurry preparation system, allowing easy change of for instance catalyst or diluent type with varying catalyst concentration and/or slurry viscosity.

In an embodiment, the invention relates to the use as indicated above, wherein the blade span of each double-bladed hub is between 30% and 50% of the diameter of the mixing vessel. The dimensions of the impellers according to the invention have likewise been found to aid in an optimal mixing and homogenization of the catalyst slurry.

According to the invention, the invention relates to the use as indicated above, wherein the at least two double-bladed hubs direct the flow to the bottom part of the mixing vessel. The impellers are mounted about the agitator shaft in such way, that each impeller directs the flow downward, i.e. away from the drive, away from the catalyst and diluent inlets and towards the catalyst slurry outlet. In such arrangement, when feeding the catalyst slurry to a downstream polymerization reactor, contradicting forces are minimized.

In an embodiment, the invention relates to the use as indicated above, wherein the impeller system is a magnetic drive impeller system, wherein the motor is an electric motor which drives an adjustable magnetic coupling to transfer torque to the agitation shaft. A magnetically driven agitator has the advantage that the impeller system which it comprises is set in motion by a magnetic coupling which occurs without physical contact between two rotating parts of which one is driven by the driven shaft of an electric motor while the other is constituted by a propelling screw or shaft. This makes it possible to arrange the part associated with the shaft of the electric motor outside the recipient while the propelling screw is installed inside the recipient. Any danger of leakage at the level of the agitator may thus be set aside. As a result, the mixing tank can be operated liquid full, without any risk of leakage and avoids environmental and safety hazards. This is particularly useful when the mixture is toxic or when pollution thereof by outside agents is to be avoided, such as for example in the case of catalyst preparations under pressurized conditions.

In an embodiment, the invention relates to the use as indicated above, wherein said catalyst slurry preparation system further comprises one or more mud pots suitable for containing concentrated catalyst slurry, wherein each mud pot is operably connected to said mixing vessel.

In another embodiment, the invention relates to the use as indicated above, wherein said mixing vessel is a liquid full tank.

In yet another embodiment, the invention relates to the use as indicated above, wherein the concentration of said solid particulate catalyst in said liquid hydrocarbon diluent is preferably between 0.1% and 10% by weight, for instance between 0.5 and 5% by weight, for example between 0.3 and 3% by weight, more preferably at least 0.2% by weight, and most preferably at least 0.3% by weight, and more preferably at most 5%, and most preferably at most 3% by weight.

The invention relates to the use as indicated above, wherein said solid particulate catalyst has an average diameter comprised between 1 µm and 100 µm, preferably between 5 µm and 100 µm, more preferably between 5 µm and 50 µm, and most preferably between 15 and 50 µm.

In another embodiment, the invention also relates to the use as indicated above, wherein said impeller system is rotatable at a speed of between 50 and 1000 rpm, and preferably between 150 and 450 rpm.

The invention also relates to the use of the catalyst slurry preparation system according to the invention for the preparation of a catalyst slurry comprising a solid particulate catalyst and a liquid hydrocarbon diluent, the solid particulate catalyst comprising an inert particle on which a catalyst selected from the group comprising metallocene catalysts, Ziegler-Natta catalysts and chromium catalysts is immobilized.

These and further aspects and embodiments of the invention are further explained in the following sections and in the claims, as well as illustrated by non-limiting figures.

DETAILED DESCRIPTION OF THE INVENTION

Before the present method and products of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In an aspect, the invention relates to the use of a catalyst slurry preparation system for preparing a catalyst slurry, in particular a diluted catalyst slurry, wherein said catalyst slurry preparation system comprises a mixing vessel comprising a top part, a bottom part and a rotatable impeller system which is actuated by a motor, the impeller system comprising a magnetic actuated agitator shaft which is positioned along a longitudinal axis of said mixing vessel and extends through the top part of the mixing vessel and comprises at least two double-bladed hubs, which are fixed to the agitator shaft. In an embodiment, the double-bladed hubs are fixed to the agitator shaft.

Figure 2:
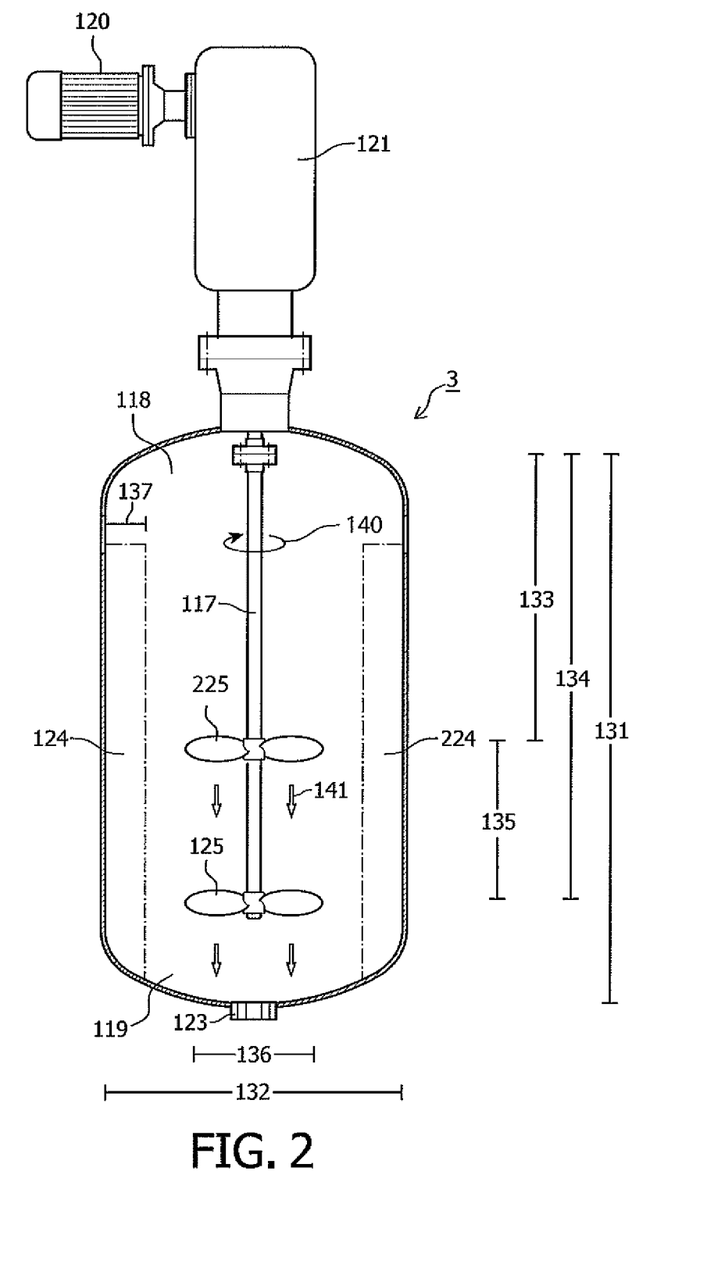
FIG. 2 depicts an embodiment of a mixing vessel of a catalyst slurry preparation system according to the invention.

In an embodiment, one or more mud pots, suitable for containing concentrated catalyst slurry, are operably connected to the mixing vessel, preferably by means of one or more conduits, as for instance illustrated on FIG. 2.

As used herein, the term "mixing vessel" is meant to comprise any kind of closed recipient suitable for use in mixing substances, in particular pressurized substances, such as catalyst slurries that are used in the preparation of polyethylene product in a loop reactor. According to the invention, the mixing vessel is a cylindrical vessel. In an embodiment, the height to diameter ratio of the mixing vessel is comprised between 1.5 and 2.5, and preferably is about 2.

In an embodiment, the mixing vessel is a liquid full tank, which means that in operation, the vessel is completely filled with catalyst slurry and has no or substantially no gas void. The term "essentially free of a gaseous phase" therefore refers to a state of the mixing vessel wherein maximal amount of gas in the mixing vessel 3 is at most 5% of the vessel volume, preferably at most 4%, at most 3%, at most 2%, at most 1% or at most 0.5% and most preferably at most 0.1% of the vessel volume. The liquid full state of the mixing vessel refers to a situation wherein the total wetted surface would be 95% or more of the total inner surface of the mixing vessel, preferably 96%, 97%, 98%, 99%, 99.5%, 99.9% or more of the total inner surface of the mixing vessel and most preferably 100% of the total inner surface of the mixing vessel. As used herein, "wetted surface" is the inner surface of the mixing vessel which is in direct contact with the liquid inside the vessel, i.e. the catalyst slurry.

In another embodiment, the volume of the mixing vessel is at least 200 l (liter), preferably at least 400 l, more preferably at least 450 l, and most preferably at most 2000 l, more preferably at most 1000 l, most preferably at most 600 l and in particularly preferred at most 550 l, for instance about 500 l.

As used herein, the term "catalyst slurry" refers to a composition comprising catalyst solid particles, i.e. a solid or particulate catalyst, and a diluent. The solid particles can be suspended in the diluent, either spontaneously or, according to the invention, by homogenization techniques, such as mixing. In the present invention it is especially applicable to solid particles of ethylene polymerization catalyst in a liquid diluent. These slurries will be referred to herein as ethylene polymerization catalyst slurries.

By the term "solid particles" it is meant a solid provided as a collection of particles, such as for instance a powder or granulate. In the present invention it is especially applicable to a catalyst provided on a carrier or support. The support is preferably a silica (Si) support.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts. In the present invention it is especially applicable to ethylene polymerization catalysts such as metallocene catalysts, chromium catalysts and/or Ziegler-Natty catalysts. Whereas "catalyst slurry" refers herein to a composition comprising catalyst solid particles and a diluent, "catalyst" refers herein to the catalyst molecules either as such or provided on a carrier or support.

Catalyst slurry according to the invention consists or consists essentially of solid catalyst, such as those given above, and a liquid hydrocarbon diluent. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

As used herein the term "catalyst slurry preparation system" refers to a device or system wherein catalyst slurry as defined herein is prepared. Said catalyst preparation system in connected to a polymerization loop reactor for supply of the prepared catalyst slurry to the reactor. In an embodiment, according to the invention, the catalyst slurry preparation system comprises at least one mixing vessel wherein catalyst slurry is diluted to a concentration suitable for use in a polymerization reaction; one or more mud pots containing concentrated catalyst slurry, one or more conduits connecting the one or more mud pots to the mixing vessel for transferring catalyst slurry from the one or more mud pots to the mixing vessel, and one or more conduits connecting the mixing vessel to a polymerization reactor for transferring the diluted catalyst slurry to the polymerization reactor. The latter conduits may be provided with pumping means for pumping the catalyst slurry from the mixing vessel to a polymerization reactor.

As used herein, the term "concentrated catalyst slurry" refers to a composition comprising catalyst solid particles that are in suspension whereby the concentration of catalyst is at least higher than 10% by weight. The term "diluted catalyst slurry" refers to a composition comprising catalyst solid particles that are in suspension, whereby the concentration of catalyst is lower than or equal to 10% by weight, for example between 0.1% and 10%, for example between 0.2 and 5% by weight, and for instance between 0.3 and 3%.

As used herein, the term "mud pot" refers to a storage vessel for concentrated catalyst slurry in a hydrocarbon diluent. The catalyst concentration in a mud pot is higher than the catalyst concentration in the mixing vessel. Therefore, after transfer of the concentrated catalyst slurry from the mud pot to the mixing vessel, additional diluent is added in the mixing vessel.

As used herein, the term "impeller system" refers to a rotor for transmitting motion. The impeller system is a system for mixing slurry, in particular slurry comprising a solid particulate catalyst and a diluent, in a mixing vessel. An impeller system according to the invention comprises an agitator shaft connected to a motor. The motor drives rotation of the agitator shaft. Fixed on the agitator shaft are impellers, which essentially are blades or vanes that are fixed onto a hub. This hub is fixed onto the agitator shaft of the impeller system. In an embodiment, the hub is slidably fixed onto the agitator shaft. This means that according to the needs, depending on e.g. catalyst concentration, viscosity, dimensions of the mixing vessel, the impellers can be fixed onto the agitator shaft at specific positions.

According to the invention, the impeller system comprises an agitator shaft and at least two double-bladed hubs fixed thereon, preferably slidably fixed. In an embodiment, the impeller system comprises 2, 3, 4, 5, or more double-bladed hubs. In a preferred embodiment, the impeller system comprises two double-bladed hubs. As used herein, the term "double-bladed hub" means a hub comprising two blades. In an embodiment, the blades are positioned symmetrically onto the hub.

In an embodiment, the agitator shaft is positioned in the centre of the mixing vessel, i.e. along the longitudinal central axis of the mixing vessel. In another embodiment, the agitator shaft is positioned at an offset from the longitudinal central axis of the mixing vessel, i.e. the agitator shaft is positioned longitudinally in the mixing vessel but not located in the centre of the mixing vessel.

In an embodiment, the impeller system is a magnetic drive impeller system, wherein the motor is an electric motor (electromotor) which drives an adjustable magnetic coupling to transfer torque to a magnetic actuated agitation shaft. Preferably, the magnetic coupling is mounted directly on top of the mixing vessel, without intermediate joints. In an example, an intank flange connection secures the agitator shaft to the mixing vessel.

In an embodiment, each of the blades of each double-bladed hub is an airfoil. In a further embodiment, each of the blades of each double-bladed hub is a flat plate airfoil. As used herein, the term "flat plate airfoil" refers to a blade which is essentially flat in appearance (i.e. viewed along a longitudinal axis from the tip of the blade to the root of the blade), with a constant thickness. In other words, the camber line of the blade is not curved, but instead is a straight line and the length of the camber line equals the length of the chord. As used herein, "chord" is the distance between the leading edge of the blade and the trailing edge of the blade. As used herein, "camber line" is the line drawn midway between the upper and lower surface of the blade. The leading and trailing edge of a blade are respectively the front and back of the blade in the direction of motion.

Figure 3:
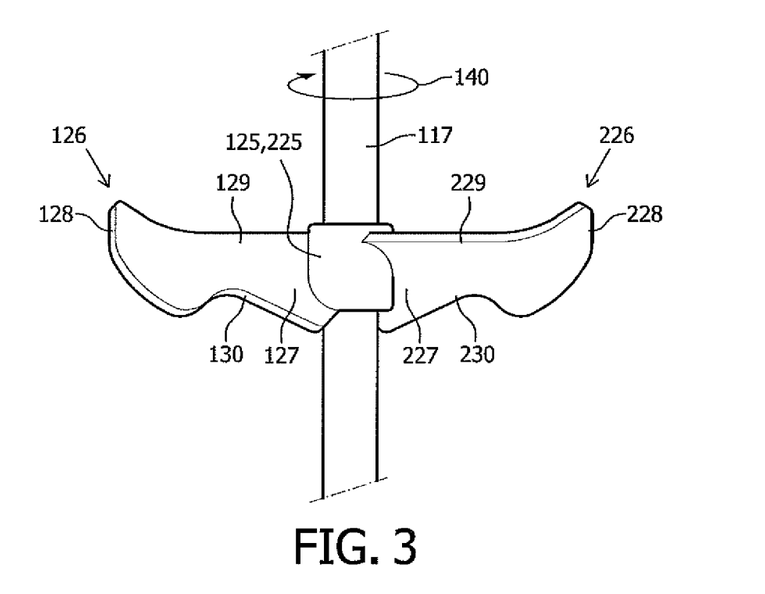
FIG. 3 is a detailed view of an embodiment of a double-bladed hub fixed on an agitator shaft that can be applied in a mixing vessel according to the invention.

In an embodiment, each blade of each double-bladed hub comprises a root portion attached to a hub and a radially outwardly disposed tip portion with therebetween an upper side edge facing the top part of the mixing vessel and a lower side edge facing the bottom part of the mixing vessel. In a further embodiment, the tip portion inclines convexly toward the top part of the mixing vessel beyond the upper side edge, wherein the upper side edge extends laterally from the root portion to the tip portion and inclines concavely toward the tip portion, and wherein the lower side edge is concave. In an embodiment, the shape or form of the tip portion of the blade and the bottom part of the mixing vessel closely correspond. This similar shape assures that catalyst particles remain suspended also in the lower part of the mixing vessel. In an embodiment, the mean width of each blade—i.e. between upper side edge and lower side edge—is about one third of the length of each blade—i.e. between root portion and tip portion—. In an embodiment, the shape of each blade is as depicted in FIG. 3.

In an embodiment, the blade span of each double-bladed hub is between about one third and one half of the diameter of the mixing vessel. In an embodiment, the blade span of each double-bladed hub is between about 30% and 50% of the diameter of the mixing vessel. In another embodiment, the blade span of each double-bladed hub is between about 35% and 45% of the diameter of the mixing vessel. In a more preferred embodiment the blade span of each double-bladed hub is about 40% of the diameter of the mixing vessel. As used herein, the term "blade span" is the distance between the tip portion of one blade of a double-bladed hub and the tip portion of the other opposing blade of that double-bladed hub.

In an embodiment, the distance between two double-bladed hubs which are fixed on the agitation shaft is between about one third and one half of the length (i.e. the height) of the mixing vessel. In another embodiment, the distance between two double-bladed hubs which are fixed on the agitation shaft is between about one third and one half of the length of the agitation shaft. In an embodiment, the distance between two double-bladed hubs is between about 30% and 50% of the height of the mixing vessel. In a further embodiment, the distance between two double-bladed hubs is between about 35% and 45% of the height of the mixing vessel. In a preferred embodiment, the distance between two double-bladed hubs is about 40% of the height of the mixing vessel.

In an embodiment, each double-bladed hub is fixed on the agitation shaft in the lower half of the mixing vessel. In another embodiment, the lower double-bladed hub is fixed on the agitation shaft in the lower quarter of the mixing vessel. In a further embodiment, one double-bladed hub is fixed on the agitation shaft between about 70% and 50% of the length of the mixing vessel, starting from the top of the mixing vessel. In another embodiment, this double-bladed hub is fixed on the agitation shaft between about 65% and 55% of the length of the mixing vessel, starting from the top of the mixing vessel, more preferably about 60%. In an embodiment, a second double-bladed hub is fixed on the agitation shaft between about 95% and 75% of the length of the mixing vessel, starting from the top of the mixing vessel. In another embodiment, this double-bladed hub is fixed on the agitation shaft between about 90% and 80% of the length of the mixing vessel, starting from the top of the mixing vessel, more preferably about 85%.

In an embodiment, the blades are symmetrically fixed on the hub and have a pitch angle ($\alpha$) comprised between about 65° and 75°, preferably about 70°. As used herein, the term "pitch angle" refers to the angle between the chord of the blade and the rotational plane of the blade (in the direction of rotation). The pitch angle can alternatively be referred to as the angle of attack.

In an embodiment, the mixing vessel of the catalyst slurry preparation system according to the invention further comprises one or more baffle(s), wherein each baffle is fixed longitudinally along the inner wall of the mixing vessel, whereby the baffle(s) extend(s) radially inward. In an embodiment, the mixing vessel comprises 1, 2, 3, 4, 5, 6 or more baffles. In a preferred embodiment, the mixing vessel comprises three baffles. In an embodiment, the baffles each extend along side wall of the mixing vessel for at least two-thirds of the length of the mixing vessel. As used herein, a "baffle" is essentially a flat screen for use to deflect or disrupt the flow in the mixing vessel.

In an embodiment, each baffle extends radially inward over a distance of at least 5% of the diameter of the mixing vessel. In another embodiment, each baffle extends radially inward over a distance of between 5% and 20% of the diameter of the mixing vessel. In a further embodiment, each baffle extends radially inward over a distance of between 10% and 20% of the diameter of the mixing vessel. In yet another embodiment, each baffle extends radially inward over a distance of between 5% and 15% of the diameter of the mixing vessel. In an embodiment, each baffle extends radially inward over an equal distance.

In another aspect, the invention relates to a catalyst slurry preparation system as described above.

Non-limiting examples of catalyst slurry preparation systems according to the present invention are for instance illustrated in FIGS. 1, 2, 3 and 4.

Figure 1:
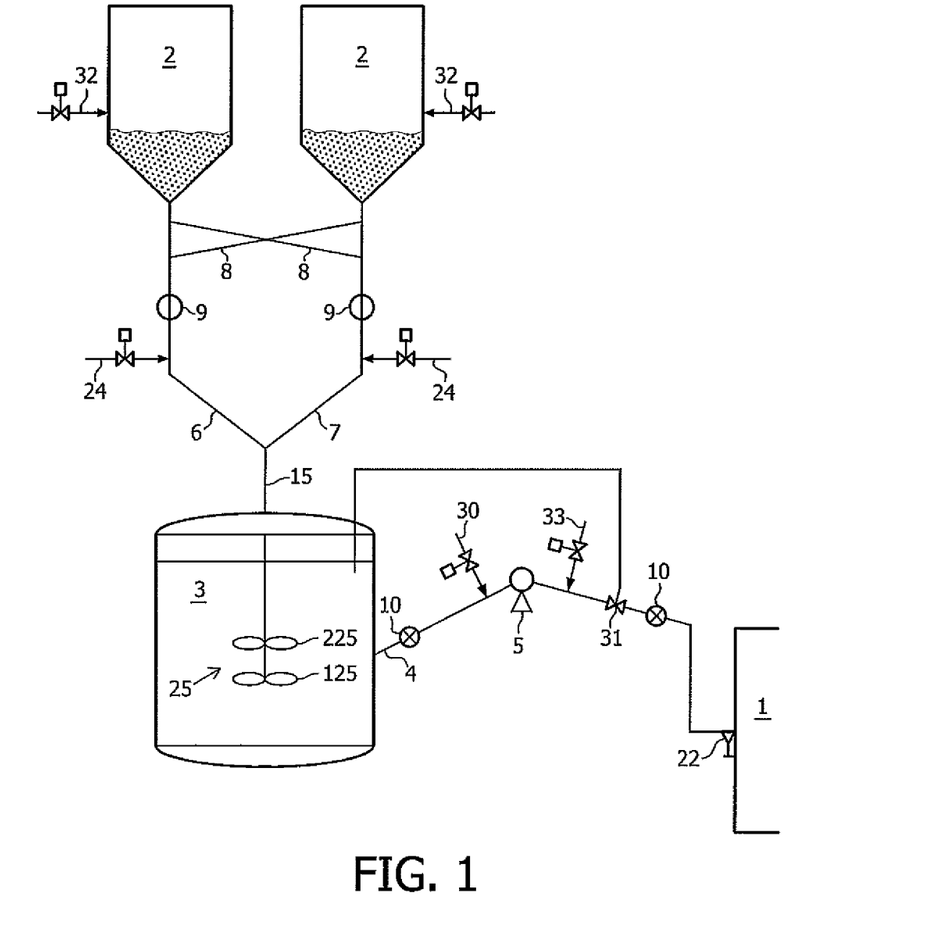
FIG. 1 is a schematic overview of an embodiment of a catalyst slurry preparation system according to the invention.

FIG. 1 represents a catalyst slurry preparation system according to the invention comprising two mud pots 2 containing concentrated catalyst slurry. Also according to the invention, only one mud pot 2 may be present. Catalyst slurry can be prepared by providing dry catalyst from a catalyst supply vessel (not shown) to said mud pots 2. Both mud pots are provided with an injection valve 32 for the addition of diluent into the mud pots 2. Conduits 6, 7 and 15 connect the mud pots 2 with a mixing vessel 3, wherein the catalyst slurry is diluted to a concentration suitable for use in a polymerization reaction. The conduit 6 for transferring said catalyst slurry from a first mud pot 2 to a mixing vessel 3 is interchangeable with a second conduit 7 for transferring said catalyst slurry from a second mud pot 2 to a mixing vessel 3 through lines 8 connecting said first 6 with said second 7 conduit. Such interconnection 8 permits, in case of interruption of transfer through one conduit 6, to discharge the catalyst slurry to the mixing vessel 3 through a second conduit 7. Conduit 6 and 7 may be provided with catalyst slurry feeders 9 for dosing the feed of catalyst slurry from the mud pots 2 to the mixing vessel 3 and injection valves 24 for the injection of diluent. The mixing vessel 3 is provided with mixing means 25. The mixing means comprises at least two double-bladed hubs 125,225. Preferably the mixing means 25 is a rotatable magnetic drive impeller system 25. The diluted slurry is then pumped through conduit 4 in a polymerization reactor 1. To that end the conduit 4 which connects the mixing vessel 3 to a polymerization reactor 1 is provided with pumping means 5. The conduit 4 may be further provided with diluent flushing means 30, 33 and flow and concentration measuring means 10, such as e.g. a coriolis flow meter. These flow and concentration measuring means 10 can be provided upstream and downstream from said pumps 5. Diluent flushing means 30, 33 enable to flush diluent such as isobutane through the conduit 4 and to keep the conduit 4 and the pumping means 5 unplugged. Conduit 4 may be further provided with a conduit and valve 31 for by-passing the pump 5. The conduits 4 for transferring catalyst slurry into to the reactor may also be equipped by one or more valves, preferably piston valves 22. The piston valves 22 are capable of sealing the orifice by which the conduit 4 is connected to the reactor 1.

FIG. 2 represents a cylindrical mixing vessel 3 of a catalyst slurry preparation system according to the invention comprising a top part 118, a bottom part 119, and a rotatable magnetic drive impeller system 25 which is actuated by an electromotor 120. The impeller system 25 comprises an agitator shaft 117 which is positioned along a central axis of the mixing vessel 3 and extends through the top part of the mixing vessel 3 where it is held by an agitator bearing unit 121, comprising the magnetic elements (not shown). The agitator bearing unit 121 is connected to the electromotor 120. The electromotor generates energy which is translated by the agitator bearing unit 121 into rotation of the agitator shaft 117. Two double-bladed hubs 125, 225 are slidably fixed to the agitator shaft 117. The top double-bladed hub 125 is fixed to the agitator shaft 117 at about 60% 133 of the length of the mixing vessel 131 from the top of the mixing vessel 118. The bottom double-bladed hub 225 is fixed to the agitator shaft 117 at about 85% 134 of the length of the mixing vessel 131 from the top of the mixing vessel 118. The distance 135 between the two double-bladed hubs 125, 225 is about 27.5% of the length of the mixing vessel 131. The blade span 136 of each double-bladed hub 125, 225 is about 40% of the diameter of the mixing vessel 132. The mixing vessel 3 further comprises 3 baffles 124, 224 (and 324, not shown on FIG. 2) which are positioned longitudinally along the inner side wall of the mixing vessel 3 and extend radially inward from the inner wall of the mixing vessel 3 over a width 137 of about 15% of the diameter of the mixing vessel 132. The mixing vessel also comprises an outlet 123 for diluted catalyst slurry at the bottom 119 of the mixing vessel 3.

The direction of rotation 140 of the impeller system 25 is such that the flow 141 of the catalyst slurry is directed predominantly axial towards the bottom of the mixing vessel 119.

FIG. 3 represents an enlarged view of an embodiment of double-bladed hub 125 comprising two blades 126, 226 which are symmetrically fixed on the hub 125. The double-bladed hub 125 is slidably fixed to the agitator shaft 117. Each blade 126, 226 comprises a root portion 127, 227 and a tip portion 128, 228 with in between an upper side edge 129, 229 and a lower side edge 130, 230. The upper side edge 129, 229 extends longitudinally from the root portion 127, 227 and inclines concavely towards the tip portion 128, 228. The lower side edge 130, 230 is concave. The tip portion 128, 228 inclines convexly between the lower side edge 130, 230 and the upper side edge 129, 229. Arrow 140 shown the direction of rotation.

Figure 4:
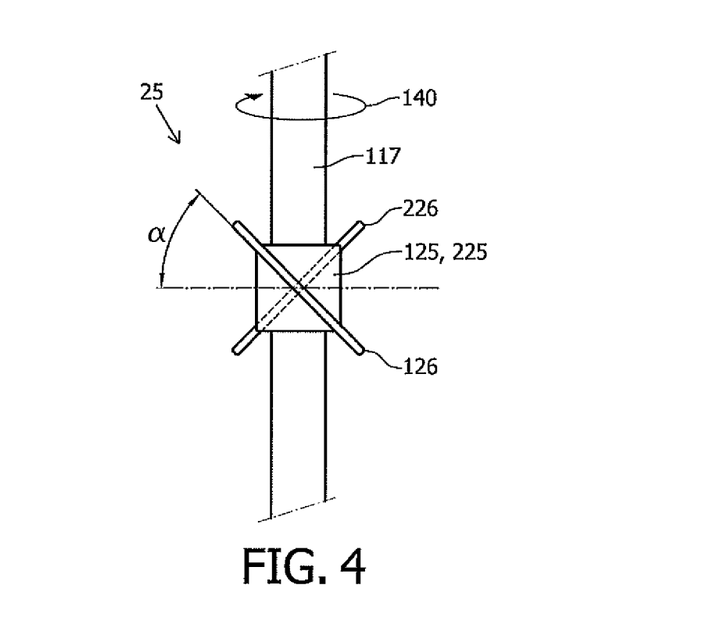
FIG. 4 illustrates the pitch angle (α) of a blade of a double-bladed hub fixed on an agitator shaft.

FIG. 4 represents a view along the central axis between the root portion 127, 227 and the tip portion 128, 228 of a blade 126, 226 of a double-bladed hub 125, 225. The double-bladed hub 125,225 is slidably fixed to the agitator shaft 117 of the rotatable magnetic drive impeller system 25. The illustrated pitch angle ($\alpha$) of each blade is about 75°. Arrow 140 shown the direction of rotation.

Figure 6:
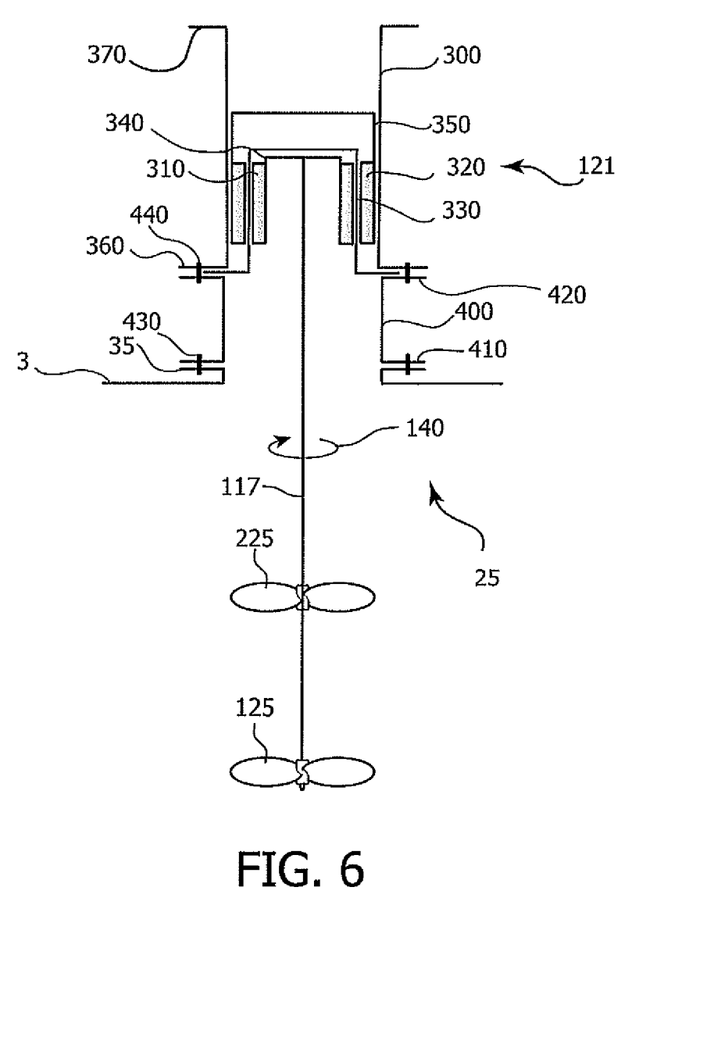
FIG. 6 represents a schematic cross-view of some elements of the rotatable magnetic drive impeller system 25.

FIG. 6 represents a schematic cross-view of some elements of the rotatable magnetic drive impeller system 25. The rotatable magnetic drive impeller system 25 comprises the agitator shaft 117 which is positioned along a central axis of the mixing vessel 3 (only partially shown) and extends through the top part of the mixing vessel 3 where it is held by an agitator unit 121, comprising the magnetic elements 310,320. The agitator shaft 117, magnetic elements 310 and inner rotor 340 are supported by bearings positioned on the lower housing 400. The agitator unit 121 is connected to the electromotor (not shown) by connection using a shaft and/or gear box (both not shown) via the top flange 370 of the unit 121. The electromotor generates energy which is translated by the agitator unit 121 into rotation (arrows 140) of the agitator shaft 117 which is provided with at least two double-bladed hubs 125, 225. The agitator unit 121, comprises a magnet coupling housing 300 and a lower housing 400. The magnetic coupling housing 300 is connected to lower housing 400 via the bottom flange 360 of the magnetic coupling housing 300 which is connected with bolts 440 to the top flange 420 of the lower housing 400. The agitator unit 121 is connected to the mixing vessel 3 via the bottom flange 410 of the lower housing 400 which is connected with bolts 430 to the top flange 35 of the mixing vessel 3. The magnetic coupling housing 300 comprises an inner rotor 340 disposed coaxially on shaft 117, and an outer rotor 350. The outer rotor 350 of the coupling housing 300 is operably connected (not shown) to the electromotor. Magnetic coupling housing 300 has circumferentially disposed arrays of permanent magnets 320, 310 in its inner and outer rotors 340 and 350, respectively. The magnets in the inner rotor 340 are aligned with the magnets in the outer rotor 350 but are polarized oppositely. The magnetic coupling housing 300 has a confinement shell 330 (also known as a separator, separating member, or containment shell) having a flange 370 which is bolted in the assembly by bolts 440. The confinement shell 330 isolates the inner rotor 340 and prevents leakage of the mixing tank.

In yet another aspect, the invention relates to a method for preparing a catalyst slurry, in particular a diluted catalyst slurry, by means of the catalyst slurry preparation system as described herein. In particular, the present invention also relates to a method for preparing a diluted catalyst slurry or a method for diluting a catalyst slurry, in a catalyst slurry preparation system as described herein, by the steps of (a1) feeding a concentrated catalyst slurry into the mixing vessel;

(a2) diluting the concentrated catalyst slurry in a suitable amount of diluent in the mixing vessel thereby obtaining a diluted catalyst slurry having a concentration suitable for use in an ethylene polymerization reaction; and (a3) mixing the diluted catalyst slurry in the mixing vessel.

In a preferred embodiment, a method is provided for preparing catalyst slurry in a catalyst slurry preparation system comprising a rotatable impeller system 25 as described herein, wherein the catalyst slurry comprises a solid particulate catalyst and a liquid hydrocarbon diluent, the method comprising the steps of:

(a1) preparing concentrated catalyst slurry in one or more mud pots 2;

(a2) transferring the concentrated catalyst slurry from the one or more mud pots 2 to the mixing vessel 3 through one or more conduits 6, 7; and (a3) diluting the concentrated catalyst slurry in a suitable amount of diluent in the mixing vessel 3 thereby obtaining a diluted catalyst slurry having a concentration suitable for use in an ethylene polymerization reaction; and (a4) mixing the diluted catalyst slurry in the mixing vessel 3 by rotation of the impeller system 25 according to the invention.

Preferably, a method is provided wherein the concentration of the solid particulate catalyst in the liquid hydrocarbon diluent in the mixing vessel is between 0.1% and 10% by weight, preferably between 0.2% and 5% by weight, and most preferably between 0.3% and 3% by weight.

In another embodiment a method is provided wherein said solid particulate catalyst has an average diameter comprised between 1 µm and 100 µm, preferably between 5 µm and 100 µm, more preferably between 10 µm and 100 µm or between 5 µm and 50 µm, even more preferably between 15 µm and 50 µm and most preferably about 40 µm.

In yet another preferred embodiment, a method is provided wherein said impeller system rotates between 50 rpm (rotations per minute) and 1000 rpm, preferably between 150 rpm and 450 rpm, more preferably between 200 rpm and 350 rpm, and even more preferably about 320 rpm.

The catalyst slurry preparation system as described herein can be used for the preparation of a diluted catalyst slurry or for diluting a catalyst slurry, said catalyst slurry comprising a solid particulate catalyst and a liquid hydrocarbon diluent, wherein said particulate catalyst is a metallocene catalyst, a chromium catalyst or a Ziegler-Natta catalyst. In an embodiment, the particulate catalyst is immobilized on a support, preferably a silica support.

In a further embodiment, the catalyst slurry preparation system as described herein can be used for bringing settled or precipitated catalyst back into suspension.

In a preferred embodiment of the present invention, said catalyst is a metallocene catalyst. The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

$$(Ar)_2MQ_2 \qquad (I); or$$

$$R''(Ar)_2MQ_2 \qquad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;

wherein M is a transition metal M selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl)zirconium dichloride ($Cp_2ZrCl_2$), bis(cyclopentadienyl)titanium dichloride ($Cp_2TiCl_2$), bis(cyclopentadienyl)hafnium dichloride ($Cp_2HfCl_2$); bis(tetrahydroindenyl)zirconium dichloride, bis(indenyl)zirconium dichloride, and bis(n-butyl-cyclopentadienyl)zirconium dichloride; ethylenebis(4,5,6,7-tetrahydro-1-indenyl)zirconium dichloride, ethylenebis(1-indenyl)zirconium dichloride, dimethylsilylene bis(2-methyl-4-phenyl-inden-1-yl)zirconium dichloride, diphenylmethylene(cyclopentadienyl)(fluoren-9-yl)zirconium dichloride, and dimethylmethylene[1-(4-tert-butyl-2-methyl-cyclopentadienyl)](fluoren-9-yl)zirconium dichloride.

The catalysts can be provided on a solid support. The support should be an inert solid, which is chemically unreactive with any of the components of the conventional metallocene catalyst. The support or carrier is an inert organic or inorganic solid, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support.

In a preferred embodiment, a polymerization catalyst applied in the present polymerization process is a supported metallocene-alumoxane catalyst consisting of a metallocene and an alumoxane which are bound on a porous silica support.

In another embodiment of the present invention, said catalyst is a chromium catalyst. The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

In another embodiment of the present invention, said catalyst is a Ziegler-Natta catalyst. The term "Ziegler-Natta catalyst" or "ZN catalyst" refers to catalysts having a general formula $M^1X_n$, wherein $M^1$ is a transition metal compound selected from group IV to VII, wherein X is a halogen, and wherein n is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use in the invention are described in U.S. Pat. No. 6,930,071 and U.S. Pat. No. 6,864,207, which are incorporated herein by reference.

In an aspect, the invention also relates to a process for preparing a particulate polyethylene product in a polymerization loop reactor, comprising the steps of:
(a) feeding ethylene monomer, a liquid hydrocarbon diluent, optionally hydrogen, and optionally olefin co-monomer into said loop reactor;
(b) feeding a catalyst slurry prepared according to a method of the invention as described herein into said loop reactor;
(c) polymerizing said monomer and said optionally co-monomer to produce a polyethylene slurry in said diluent in said loop reactor;
(d) allowing said polyethylene slurry to settle into one or more settling legs connected to said loop reactor;
(e) discharging the settled polyethylene slurry from said one or more settling legs out of said loop reactor.

The following non-limiting example illustrates the invention.

EXAMPLES

Example 1

The present example illustrates the use of a catalyst slurry preparation system according to an embodiment of the invention for preparing diluted catalyst slurry. The polymerization catalyst comprises a metallocene catalyst immobilized on a porous silica support. The metallocene consists in particular of ethylenebis(4,5,6,7-tetrahydro-1-indenyl)zirconium dichloride. The median particle diameter of the polymerization catalyst is 40 μm. The polymerization catalyst can be used to prepare a particulate polyethylene resin in a loop reactor.

The characteristics of the mixing vessel and the process characteristics for the present example for preparing diluted catalyst slurry are given in Table 1. The flow rate measures how much catalyst slurry is hourly outputted from the mixing vessel, and is thus a measure for catalyst residence time in the mixing vessel as well as catalyst turnover time in the mixing vessel.

TABLE 1

| | |
|---|---|
| volume of mixing vessel (l) | 500 |
| average mixing speed (rpm) | 325 |
| flow rate (l/h) | 200 |
| average catalyst concentration (wt %) | 0.42 |

Figure 5:
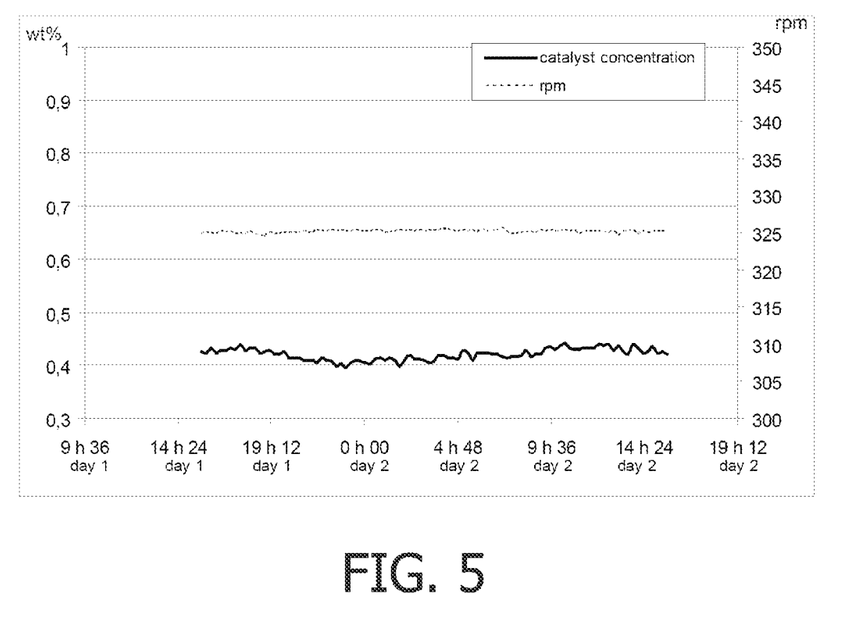
FIG. 5 illustrates the concentration of catalyst issued from a catalyst mixing vessel and prepared using a catalyst slurry preparation system according to the invention over a period of time of 2 days.

The concentration of polymerization catalyst (wt % on Y-ordinate) at the outlet of the mixing vessel, i.e. before feeding to the polymerization reactor, was measured over a time span of 2 days (on X-ordinate). The results are illustrated in FIG. 5. As can be seen, the concentration is relatively constant over time, indicating adequate mixing in the mixing vessel, resulting in homogeneous catalyst slurry with a mainly consistent catalyst concentration which can be fed to the polymerization reactor.

Example 2

A mixing tank comprising a magnetic actuated agitator shaft driven by magnetic drive impeller system as schematically illustrated in FIGS. 2 and 6 was used to prepare a catalyst slurry. The catalyst slurry comprised 0.5% by weight of a metallocene catalyst immobilized on a porous silica support in an isobutane diluent. The metallocene consists in particular of ethylenebis(4,5,6,7-tetrahydro-1-indenyl)zirconium dichloride. The mixing tank was operated liquid full. Due to the magnetic coupling, the vessel containing the agitator was hermetically closed and the catalyst slurry could be prepared under liquid full conditions without any leakage.

Comparatively, a mixing tank comprising an agitator with a mechanical seal could not be used liquid full without observing leakage.

The invention claimed is:

1. A process comprising:
preparing a diluted catalyst slurry in a catalyst slurry preparation system wherein the diluted catalyst slurry comprises a solid particulate catalyst and a liquid hydrocarbon diluent, wherein said catalyst slurry preparation system comprises:
a mixing vessel comprising a top part, a bottom part and a rotatable impeller system which is actuated by a motor,
wherein the rotatable impeller system comprises a magnetic actuated agitator shaft which is positioned along a longitudinal axis of said mixing vessel and extends through said top part of said mixing vessel and comprises at least two double-bladed hubs which are fixed to said magnetic actuated agitator shaft.

2. The process according to claim 1, wherein said mixing vessel further comprises one or more baffles, wherein said one or more baffles are fixed longitudinally along an inner wall of said mixing vessel, whereby said one or more baffles extend radially inward.

3. The process according to claim 1, wherein the blades of each double-bladed hub are symmetrically positioned about said double-bladed hub and have a pitch angle (α) between 65° and 75°.

4. The process according to claim 1, wherein each blade of said double-bladed hub is an airfoil comprising a root portion attached to the double-bladed hub and a radially outwardly disposed tip portion with an upper side edge therebetween, wherein the upper side edge faces the top part of said mixing vessel, and wherein each blade comprises a lower side edge facing said bottom part of said mixing vessel.

5. The process according to claim 4, wherein said tip portion inclines convexly toward said top part of said mixing vessel beyond said upper side edge, wherein said upper side edge extends laterally from said root portion to said tip portion and inclines concavely toward said tip portion, and wherein said lower side edge is concave.

6. The process according to claim 1, wherein a first double-bladed hub is fixed to said magnetic actuated agitator shaft in a lower half of said mixing vessel.

7. The process according to claim 6, wherein a second double-bladed hub is fixed to said magnetic actuated agitator shaft in a lower quarter of said mixing vessel.

8. The process according to claim 7, wherein a distance between said first and said second double-bladed hub is between one half to one third of a length of said magnetic actuated agitator shaft.

9. The process according to claim 1, wherein said one or more baffles extend radially inward over a distance of between 10% and 20% of a diameter of said mixing vessel.

10. The process according to claim 1, wherein said double-bladed hub has a blade span of between 30% and 50% of a diameter of said mixing vessel.

11. The process according to claim 1, further comprising one or more mud pots suitable for containing a concentrated catalyst slurry, wherein each mud pot is operably connected to said mixing vessel.

12. The process according to claim 11, wherein the mixing vessel is connected to a polymerization reactor.

13. The process according to claim 1, wherein said mixing vessel is a liquid full tank.

14. The process according to claim 1, wherein the concentration of said solid particulate catalyst in said liquid hydrocarbon diluent is between 0.1% and 10% by weight.

15. The process according to claim 1, wherein said solid particulate catalyst has an average diameter between 1 μm and 100 μm.

16. The process according to claim 1, wherein said rotatable impeller system is rotatable at a speed of between 50 and 1000 rpm.

17. The process according to claim 1, wherein said mixing vessel is cylindrical.

* * * * *